(12) United States Patent
Kumakura et al.

(10) Patent No.: US 11,969,810 B2
(45) Date of Patent: Apr. 30, 2024

(54) WORK MACHINE

(71) Applicant: Koki Holdings Co., Ltd., Tokyo (JP)

(72) Inventors: Takeru Kumakura, Ibaraki (JP); Shigeharu Ushiwata, Ibaraki (JP)

(73) Assignee: Koki Holdings Co., Ltd., Tokyo (JP)

( * ) Notice: Subject to any disclaimer, the term of this patent is extended or adjusted under 35 U.S.C. 154(b) by 625 days.

(21) Appl. No.: 17/263,525

(22) PCT Filed: Sep. 20, 2019

(86) PCT No.: PCT/JP2019/036999
§ 371 (c)(1),
(2) Date: Jan. 26, 2021

(87) PCT Pub. No.: WO2020/066902
PCT Pub. Date: Apr. 2, 2020

(65) Prior Publication Data
US 2021/0237177 A1 Aug. 5, 2021

(30) Foreign Application Priority Data
Sep. 28, 2018 (JP) ................................ 2018-184667

(51) Int. Cl.
*B23D 47/12* (2006.01)
*B25F 5/02* (2006.01)
*B27B 5/29* (2006.01)

(52) U.S. Cl.
CPC ............... *B23D 47/12* (2013.01); *B25F 5/02* (2013.01); *B27B 5/29* (2013.01)

(58) Field of Classification Search
None
See application file for complete search history.

(56) References Cited

U.S. PATENT DOCUMENTS

| 2006/0266186 A1 | 11/2006 | Ozawa et al. |
| 2015/0263592 A1 | 9/2015 | Kawakami et al. |
| 2017/0239803 A1 | 8/2017 | Aoki |
| 2018/0056473 A1 | 3/2018 | Fisher et al. |
| 2018/0117728 A1 | 5/2018 | Kawakami et al. |
| 2018/0161891 A1* | 6/2018 | Nishikawa ............ B23D 45/04 |

(Continued)

FOREIGN PATENT DOCUMENTS

| CN | 102056697 | 5/2011 |
| CN | 102837297 | 12/2012 |
| CN | 106470804 | 3/2017 |

(Continued)

OTHER PUBLICATIONS

"Search Report of Europe Counterpart Application", issued on Oct. 19, 2021, p. 1-p. 10.

(Continued)

*Primary Examiner* — Hwei-Siu C Payer
(74) *Attorney, Agent, or Firm* — JCIPRNET

(57) ABSTRACT

Provided is a work machine that has excellent motor support performance. A work machine that has: a motor that has a rotary shaft; a bearing that rotatably supports the rotary shaft; and a motor housing part that houses the motor. The motor housing part can be divided into at least two segments in the axial direction of the rotary shaft. At least one of the two segments: forms an integral structure that cannot be divided; and supports the bearing.

12 Claims, 7 Drawing Sheets

(56) References Cited

U.S. PATENT DOCUMENTS

2019/0344461 A1* 11/2019 Kamiya ................. B26B 25/00
2021/0237177 A1* 8/2021 Kumakura ............. B23D 47/00

FOREIGN PATENT DOCUMENTS

| | | |
|---|---|---|
| CN | 107635734 | 1/2018 |
| EP | 2433758 | 3/2012 |
| EP | 2712712 | 4/2014 |
| EP | 2813327 | 12/2014 |
| JP | 2007152479 | 6/2007 |
| JP | 2008229876 | 10/2008 |
| JP | 2016155218 | 9/2016 |
| JP | 2017213621 | 12/2017 |
| JP | 6284071 | 2/2018 |
| JP | 2018122396 | 8/2018 |
| WO | 2016158129 | 10/2016 |
| WO | 2018139085 | 8/2018 |

OTHER PUBLICATIONS

"International Search Report (Form PCT/ISA/210) of PCT/JP2019/036999", mailed on Nov. 26, 2019, with English translation thereof, pp. 1-2.

"Office Action of China Counterpart Application", issued on Apr. 27, 2023, submit with machine English translation thereof, pp. 1-20.

* cited by examiner

WORK MACHINE

CROSS-REFERENCE TO RELATED APPLICATION

This application is a 371 application of the International PCT application serial no. PCT/JP2019/036999, filed on Sep. 20, 2019, which claims the priority benefits of Japan Patent Application No. 2018-184667, filed on Sep. 28, 2018. The entirety of each of the above-mentioned patent applications is hereby incorporated by reference herein and made a part of this specification.

BACKGROUND

Technical Field

The invention relates to a work machine.

Description of Related Art

Conventionally, a cutting machine has been widely used as an example of a working machine for cutting wood, pipes and the like (materials to be cut).

In the cutting machine described in Patent Document 1, a motor housing part housing a motor that serves as a prime mover can be divided into multiple segments on a plane parallel to the axial direction of the motor, facilitating the disposition of parts and the like to be housed in the motor housing part and ensures easy assembly.

Further, electronic parts such as a display part for notifying the state of the work machine is clamped by the segments of the motor housing part and exposed from the motor housing part so that an operator can check the electronic parts.

RELATED ART

Patent Document

[Patent Document 1] JP Patent No. 6284071

SUMMARY

Problems to be Solved

However, in the cutting machine described in Patent Document 1, since the bearing of the motor is supported by two segments, if relative positions of the two segments shift, the bearing may be insufficiently supported.

Moreover, when electronic parts are clamped by the segments of the motor housing part, it is necessary to position the electronic parts on the mating surface (segmented surface) where the segments are brought into contact with each other, but in the configuration described in the prior art documents, when another electronic part is to be positioned at a different position in the peripheral direction with respect to one electronic part, it can only be disposed at a position shifted by 180 degrees in the peripheral direction with respect to the one electronic part when viewed in an axial direction. Therefore, the position of the electronic parts is restricted, and it may be difficult to dispose the electronic parts at a desired position.

In view of such a problem, the invention aims to provide a work machine in which the bearing supporting ability of the motor is suppressed from declining.

Another aim of the invention is to provide a work machine capable of improving the degree of freedom in the disposition of electronic parts to be disposed in a housing that houses the motor.

Means for Solving the Problem

In order to solve the above problem, the invention provides a work machine having a motor having a rotor and a stator, a rotary shaft that rotates integrally with the rotor, a bearing that rotatably supports the rotary shaft, and a motor housing part that houses the motor, where the motor housing part may be divided into at least two segments in the axial direction of the rotor, and at least one of the two segments is configured to form a non-dividable integral structure so as to support the bearing. Further, each of the two segments is also provided with a rail to hold a battery.

Effects

According to the work machine of the invention, the motor can be suitably supported. The battery can also be suitably supported.

DESCRIPTION OF THE EMBODIMENTS

A tabletop circular saw 1, which is an example of a cutting tool according to an embodiment of the invention, will be described with reference to FIG. 1 and FIG. 2. The tabletop circular saw 1 is an electric cutting tool that cuts wood and aluminum sashes (materials to be cut), and as shown in FIG. 1, includes a base part 2 and a holder (tilt support part) 3, and a cutting part 6 to which a cutting blade P and a battery pack 80 may be attached.

Figure 1:
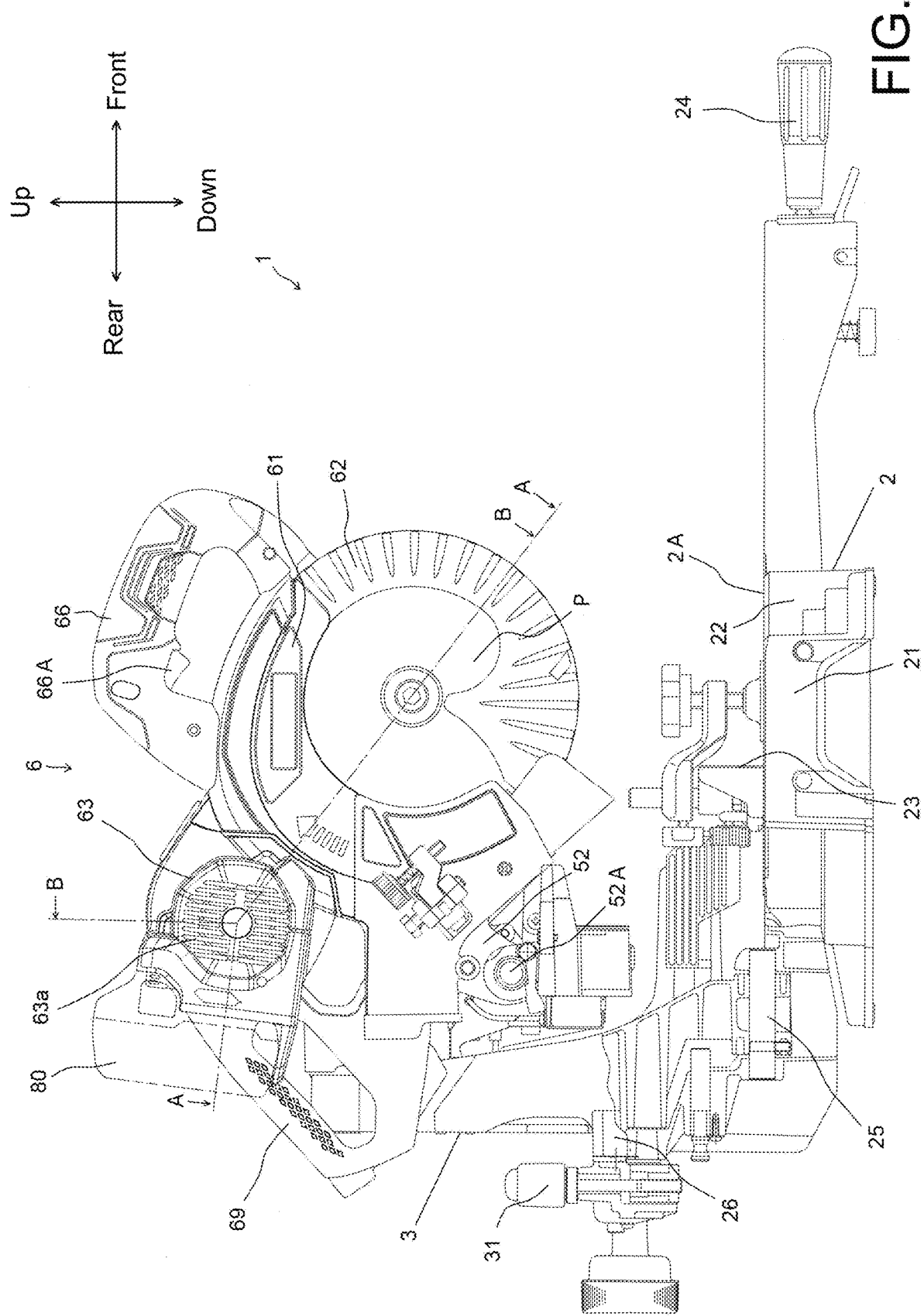
FIG. 1 is a right side view showing an appearance of a tabletop circular saw according to an embodiment of the invention.

In the following description, "up" shown in FIG. 1 is defined as an upper direction, "down" is defined as a lower direction, "front" is defined as a forward direction, and "rear" is defined as a backward direction. Further, in FIG. 1, the direction from the paper toward the near side in relation to an observer is defined as a right direction, and the direction from the paper toward the far side in relation to an observer is defined as a left direction. When dimensions and numerical values are referred to in this specification, not only the dimensions and numerical values that exactly match the dimensions and numerical values, but also substantially the same dimensions and numerical values (for example, within the range of manufacturing error) are included. Similarly, the terms "same", "orthogonal", "parallel", "coincide", "flush", "constant" and the like include "substantially the same", "substantially orthogonal", "substantially parallel", "substantially aligned", "substantially flush", and "substantially constant" and the like. In the following, unless otherwise stated, a description will be given based on a state in which the cutting blade P is not tilted or swung with respect to a placement surface 2A of the base part 2 (the state shown in FIG. 1).

As shown in FIG. 1, the base part 2 has a base 21, a turntable 22 and a fence 23.

The base 21 is made of metal and is a part that may be placed on the floor of a building, a work table, or the like. The turntable 22 is made of metal and is connected to the base 21 via a turning shaft (not shown) orthogonal to an upper surface, and the upper surface is disposed to be substantially flush with an upper surface of the base 21. The placement surface 2A on which a material to be cut (materials to be processed) may be placed is defined by the upper surface of the base 21 and the upper surface of the turntable 22. The base 21 and the turntable 22 are provided with a groove (not shown) that allows the cutting blade P to enter when the cutting part 6 is lowered during cutting operation.

As shown in FIG. 1, an operation part 24 is provided at a front part of the turntable 22. The operation part 24 is a part operated by a user when rotating and fixing the rotating position of the turntable 22. Further, as shown in FIG. 1, a tilt axis 25 and a protruding part 26 are provided at a rear part of the turntable 22. The tilt axis 25 is provided so as to extend in the front-rear direction in parallel with a side surface of the cutting blade P and have a central axis coincided with the upper surface of the turntable 22. The protruding part 26 protrudes upward from a rear part of the base 21 and has a long hole formed as an arc-shaped centered on a central axis of the tilt axis 25.

Figure 2:
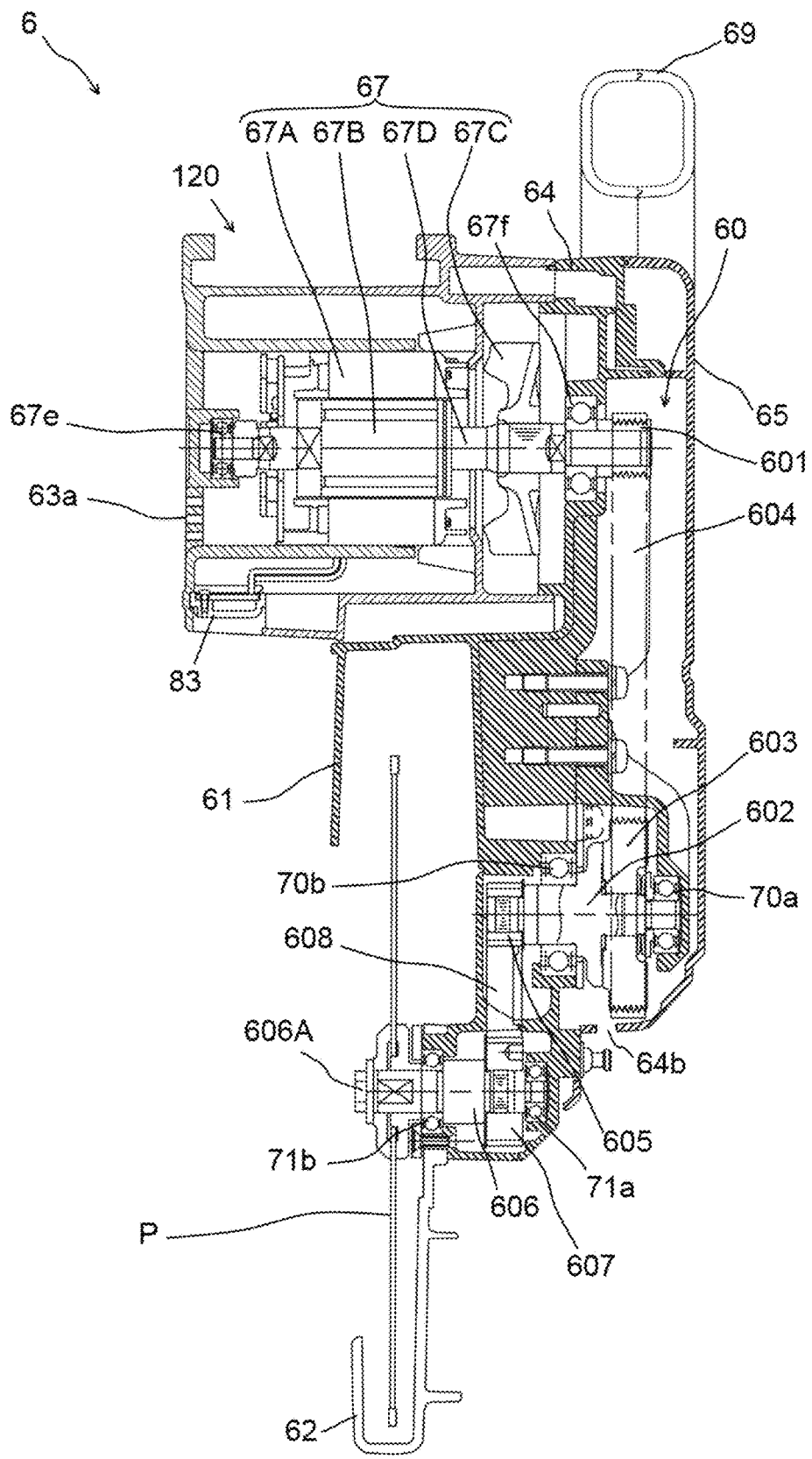
FIG. 2 is a cross-sectional view along line A-A of FIG. 1.

As shown in FIG. 1 and FIG. 2, the holder 3 is provided between the base 21 and the cutting part 6. The holder 3 is erected upward at the rear part of the turntable 22, and a lower part of the holder 3 is supported so as to be tiltable centering on the tilt axis 25. Thus, the holder 3 may be tilted in the left-right direction with respect to the turntable 22.

As shown in FIG. 2, the cutting part 6 includes a motor 67 and a transmission mechanism 60, and the transmission mechanism 60 is partially covered by a gear cover 65.

As shown in FIG. 1 and FIG. 2, the cutting part 6 includes a saw cover 61, a protective cover 62, a motor housing part 63, a gear case 64, and the gear cover 65. FIG. 2 is a cross-sectional view along line A-A of FIG. 1.

As shown in FIG. 1 and FIG. 2, the saw cover 61 covers part of an outer periphery of the cutting blade P. The protective cover 62 may be housed in the saw cover 61, and is rotatably provided in the saw cover 61 so as to cover the outer periphery of the cutting blade P of a part protruding from the saw cover 61.

As shown in FIG. 1, in a state where the cutting part 6 is rotating upward, the protective cover 62 rotates to a position where the outer periphery of the cutting blade P of the part protruding from the saw cover 61 is covered; in a state where the cutting part 6 is rotated downward, the protective cover 62 is housed in the saw cover 61 by a link mechanism (not shown) and rotates to a position where the outer periphery of the cutting blade P of the part protruding from the saw cover 61 is exposed.

The motor housing part 63 has a substantially cylindrical shape extending in the left-right direction, and a slit-shaped inlet port 63a is formed on a right side surface of the motor housing part 63, as shown in FIG. 1. The motor housing part 63 is integrally provided with a handle part 66. The handle part 66 is located on an extension line of the side surface of the cutting blade P. The handle part 66 is provided with a switch 66A that controls a drive of the motor 67 housed in the motor housing part 63. The switch 66A is a trigger type switch; when the work is turned on, the drive of the motor 67 starts. Incidentally, the motor 67 is a brushless motor. The motor 67 is an example of the motor of the invention, and the motor housing part 63 is an example of the motor housing part of the invention.

As shown in FIG. 2, the gear case 64 is connected to a left side of the motor housing part 63 and has a wall part extending in a direction parallel to the cutting blade P. The gear cover 65 is connected to a lower right opening of the gear case 64, and has a wall part which extends in a direction parallel to the cutting blade P. The transmission mechanism 60 is disposed in a space defined by an inner surface of the gear case 64 and an inner surface of the gear cover 65.

As shown in FIG. 2, the motor 67 is housed inside the motor housing part 63, and has a stator 67A, a rotor 67B, a fan 67C, and a rotary shaft 67D. Further, the stator 67A is provided with a control board 67E that controls the motor 67. The control board 67E is provided with a switching part that controls the drive of the motor 67. The rotary shaft 67D has a substantially cylindrical shape and is disposed so as to extend in the left-right direction of the stator 67A. The rotary shaft 67D is supported rotatably by the motor housing part 63 via the bearing 67e. A left end of the rotary shaft 67D is supported rotatable by the gear case 64 via a bearing 67f.

The fan 67C is fixed to the rotary shaft 67D on a left side of the stator 67A. The fan 67C is a centrifugal fan that rotates integrally with the rotary shaft 67D, and cools the stator 67A, the rotary shaft 67D, the transmission mechanism 60, and the like by sucking the outside air from the inlet port 63a of the motor housing part 63 and exhausting it from an exhaust port 64b formed at a lower part of the gear case 64.

The transmission mechanism 60 is a part that transmits the rotation of the motor 67 to the cutting blade P by two-stage deceleration using two belts, and, as shown in FIG. 42, includes a first pulley 601, an intermediate shaft 602, a second pulley 603, a first belt 604, a third pulley 605, a spindle 606, a fourth pulley 607, and a second belt 608. Among them, the first pulley 601, the second pulley 603, and the first belt 604 form a first-stage transmission mechanism, and the third pulley 605, the fourth pulley 607, and the second belt 608 form a second-stage transmission mechanism.

The first pulley 601 is a V-pulley and has a groove extending in the peripheral direction on an outer peripheral surface. The first pulley 601 is fixed to the left end of the rotary shaft 67D on an outer side (left side) of the gear case 64, and is integrally rotatable with the rotary shaft 67D.

The intermediate shaft 602 is located between the rotary shaft 67D and the spindle 606 on a path transmitting the rotational force of the rotary shaft 67D. The intermediate shaft 602 has a substantially cylindrical shape and is disposed so as to extend in the left-right direction in parallel with the rotary shaft 67D. The intermediate shaft 602 is supported rotatably by the gear case 64 via a bearing 70a and a bearing 70b. That is, the intermediate shaft 602 is rotatably supported by two bearings.

The second pulley 603 is a V-pulley having a substantially cylindrical shape extending in the left-right direction, and has a groove extending in the peripheral direction on an outer peripheral surface. An outer diameter of the second pulley 603 is larger than an outer diameter of the first pulley 601. A left end of the intermediate shaft 602 is passed through the second pulley 603.

The first belt 604 is an endless belt made of resin and formed in an endless shape, and is a V belt in which a groove extending in the longitudinal direction is formed on an inner peripheral surface. The first belt 604 is stretched between the first pulley 601 and the second pulley 603 by having an upper part bridged over an outer periphery of the first pulley 601 and a lower part bridged over an outer periphery of the second pulley 603. That is, the first belt 604 is held circumferentially movable by a pair of pulleys (the first pulley 601 and the second pulley 603) on a path transmitting the rotational force. The first pulley 601 and the second pulley 603 are V pulleys, and the first belt 604 is a V belt. The rotation transmission from the pulley to the belt and from the belt to the pulley is carried out by friction. In other words, since the rotation transmission is not based on the meshing of gears, when excessive high load occurs on the cutting edge P, the V belt slides around the outer periphery of the V-pulley, interrupting the rotation transmission and preventing damage to each part that transmits rotation.

The third pulley 605 is a timing pulley having a substantially cylindrical shape extending in the left-right direction, and has gear-shaped irregularities formed on an outer peripheral surface. The third pulley 605 is fixed to a right side of a central part of the intermediate shaft 602 by press fitting, and is integrally rotatable with the intermediate shaft.

The spindle 606 has a substantially cylindrical shape and is disposed so as to extend in the left-right direction in parallel with the rotary shaft 67D and the intermediate shaft 602. The spindle 606 is supported rotatable by the gear case 64 via the bearing 71a and the bearing 71b. A mounting part 606A having a bolt or other fasteners that mount the cutting blade P is provided at a right end of the spindle 606.

The fourth pulley 607 is a timing pulley having a substantially cylindrical shape extending in the left-right direction, and has gear-shaped irregularities formed on an outer peripheral surface. The fourth pulley 607 has a larger outer diameter than an outer diameter of the third pulley 605. The fourth pulley 607 is fixed to a left side of a central part of the spindle 606 by press fitting, and is integrally rotatable with the spindle 606.

The second belt 608 is an endless belt made of resin and formed in an endless shape, and is a timing belt in which gear-shaped irregularities are formed on an inner peripheral surface. The second belt 608 is stretched between the third pulley 605 and the fourth pulley 607 by bridging an upper part to an outer periphery of the third pulley 605 and bridging a lower part to an outer periphery of the fourth pulley 607. At this time, the irregularities of the inner peripheral surface of the second belt 608 is meshed with the irregularities of the outer peripheral surface of the third pulley 605 and the irregularities of the outer peripheral surface of the fourth pulley 607, so that the rotation of the third pulley 605 is transmitted to the fourth pulley 607 via the second belt 608 to rotate. The second belt 608 is held circumferentially movable by a pair of pulleys (the third pulley 605 and the fourth pulley 607) on a path transmitting the rotational force. The third and fourth pulleys 605 and 607 are timing pulleys, and the second belt 608 is a timing belt, each are configured to transmit rotation by meshing the irregularities formed side by side in the rotational direction, and are therefore suitable for high torque rotation transmission. Even when heavy load occurs in the cutting blade P, the occurrence of rattling and the like is prevented, the intermediate shaft 602 can be supported with high accuracy, enabling efficient and stable cutting work to be performed. Further, by using the timing belt and the timing pulleys, the transmission efficiency of the rotation is improved, and, since the belt is prevented from being damaged, the durability of the tool is improved.

Next, the operation of transmitting the rotation of the motor 67 to the cutting blade P will be described. When the switch 66A of the handle part 66 is pressed, the motor 67 is driven, and the rotary shaft 67D starts rotating integrally with the first pulley 601. Along with the rotation, the first belt 604 bridged over the first pulley 601 starts to rotate due to the friction acting between the inner peripheral surface of the first belt 604 and the first pulley 601. That is, the first belt 604 transmits the rotation of the rotary shaft 67D and the first pulley 601 to the second pulley 603, and the second pulley 603 starts to rotate.

Because the second pulley 603 is configured with a larger diameter than the first pulley 601, the rotation of the rotary shaft 67D is decelerated and transmitted to the intermediate shaft 602. That is, the first-stage transmission mechanism including the first pulley 601, the second pulley 603, and the first belt 604 decelerates the rotation of the rotary shaft 67D and transmits the rotation to the intermediate shaft 602.

In this state, the third pulley 605 fixed to the intermediate shaft 602 rotates. With this rotation, the second belt 608 that meshes with the third pulley 605 is rotated by the third pulley 605, and the fourth pulley 607 that meshes with the second belt 608 is rotated by the second belt 608. Because the fourth pulley 607 is configured with a larger diameter than the third pulley 605, the rotation of the intermediate shaft 602 is decelerated and transmitted to the spindle 606. That is, the second-stage transmission mechanism including the third pulley 605, the fourth pulley 607, and the second belt 608 decelerates the rotation of the intermediate shaft 602 and transmits the rotation to the rotation to the spindle 606.

With the rotation of the spindle 606, the cutting blade P mounted on the mounting part 606A of the spindle 606 rotates together with the spindle 606 at the same rotation speed. As described above, the rotation of the rotary shaft 67D is decelerated in two stages by a two-stage transmission mechanism to be transmitted to the cutting blade P.

Next, a cutting work using the tabletop circular saw 1 will be described.

First, when a material is to be cut at a cutting angle perpendicular to the placement surface 2A of the base 21, the switch 66A is pressed and the motor 67 is driven to rotate the cutting blade P. In this state, the cutting part 6 is moved downward to start cutting the material to be cut. Specifically, the cutting part 6 is moved downward by turning (swinging) the cutting part 6 centering on a turning shaft 52A of a cutting part supporting part 52.

On the other hand, when the material is to be cut at a cutting angle that is not perpendicular to the placement surface 2A of the base 21, an operator operates a clamp lever 31 of the holder 3 to release the fixation of the holder 3 to the base part 2. In this state, the operator moves the handle part 66 in the left-right direction. As the handle part 66 moves in the left-right direction, the holder 3 and the cutting part 6 tilt centering on an axis of the tilt axis 25 of the base part 2. The operator fixes the holder 3 to the base part 2 at a desired tilt angle using the clamp lever 31 and swings the cutting part 6 at an upper dead center position to a bottom dead center position to perform the cutting work.

Next, the motor housing part 63 in the tabletop circular saw 1 will be described with reference to FIG. 2 to FIG. 6. Note that FIG. 6 is an exploded view of the periphery of the motor housing part 63, described as a reference view for understanding the structure and positional relationship.

Figure 3:
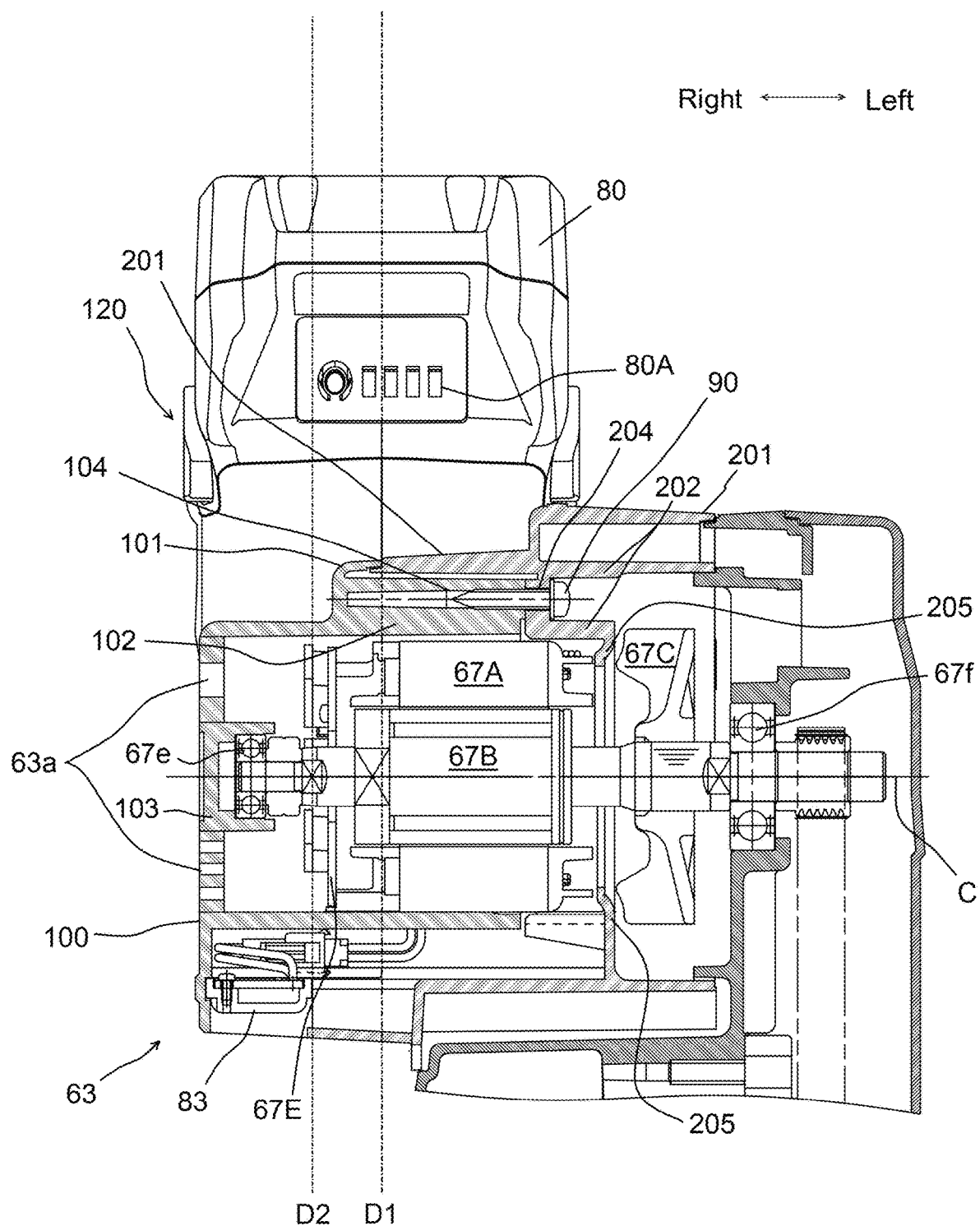
FIG. 3 is a cross-sectional view along line B-B of FIG. 1.

FIG. 2 is a cross-sectional view taken along line A-A of FIG. 1. FIG. 3 is a cross-sectional view along line B-B of FIG. 1. Note that the line A-A and the line B-B of FIG. partially overlap.

The motor housing part 63 may be divided in the direction of the rotary shaft 67D (axis C); specifically, it may be divided into a right housing 100 and a left housing 200. The right housing 100 and the left housing 200 are examples of the two segments in the invention. The motor housing part 63 is formed by fixing the right housing part 100 and the left housing 200 to each other by multiple screws including a screw 90.

The right housing 100 is made as an integral structure that cannot be divided. The right housing 100 is provided with an outer wall 101, and an inner wall 102 located inside the outer wall 101. A bearing holding part 103 and an inlet port 63a are formed at a right end of the right housing 100. The bearing holding part 103 supports a bearing 67e provided at a right end of the rotary shaft 67D. The inlet port 63a described above that is slit-shaped is provided around the bearing holding part 103. Further, the inner wall 102 of the right housing 100 is provided with a screw hole 104 into which the screw 90 is screwed. The screw holes 104 are provided at three locations in the peripheral direction.

The left housing 200 is made as an integral structure that cannot be divided. The left housing 200 is provided with an outer wall 201, and an inner wall 202 located inside the outer wall 201. Further, the inner wall 202 is provided with a through hole 204 through which the screw 90 is passed. The through holes 204 are provided at three positions in the peripheral direction so as to correspond to the screw holes 104. The screw 90 is screwed into the screw hole 104 through the left housing 200, so that the left housing part 200 is fixed to the right housing. The fan 67C is provided inside the outer wall 201. Further, the left housing 200 is provided with a fan guiding part 205 protruding inward from the inner surface of the outer wall 201. The fan guiding part 205 is an annular part that extends from the inner surface of the outer wall 201 to an inside of an outermost edge of the fan 67C and covers a periphery of the rotary shaft 67D, and has a function of guiding the air flowing in from the inlet port 63a to flow to a central position of the fan 67C. As a matter of course, since the fan guiding part 205 is also integrally formed, there is no gap through which air leaks, and the air can be guided appropriately. The air entering from the inlet port 63a enters insides of the gear case 64 and the gear cover 65 after cooling the motor 67, and is exhausted from the exhaust port 64b.

The motor housing part 63 is provided with a battery attachment/detachment part 120 to which a battery pack 80 for supplying electric power to the motor 67 is attached. The battery attaching/detaching part 120 has a pair of body side rails (a body right rail 107 and a body left rail 207) that may be engaged with a pair of battery side rails (a battery right rail 87A and a battery left rail 87B) provided in the battery pack 80.

Figure 4:
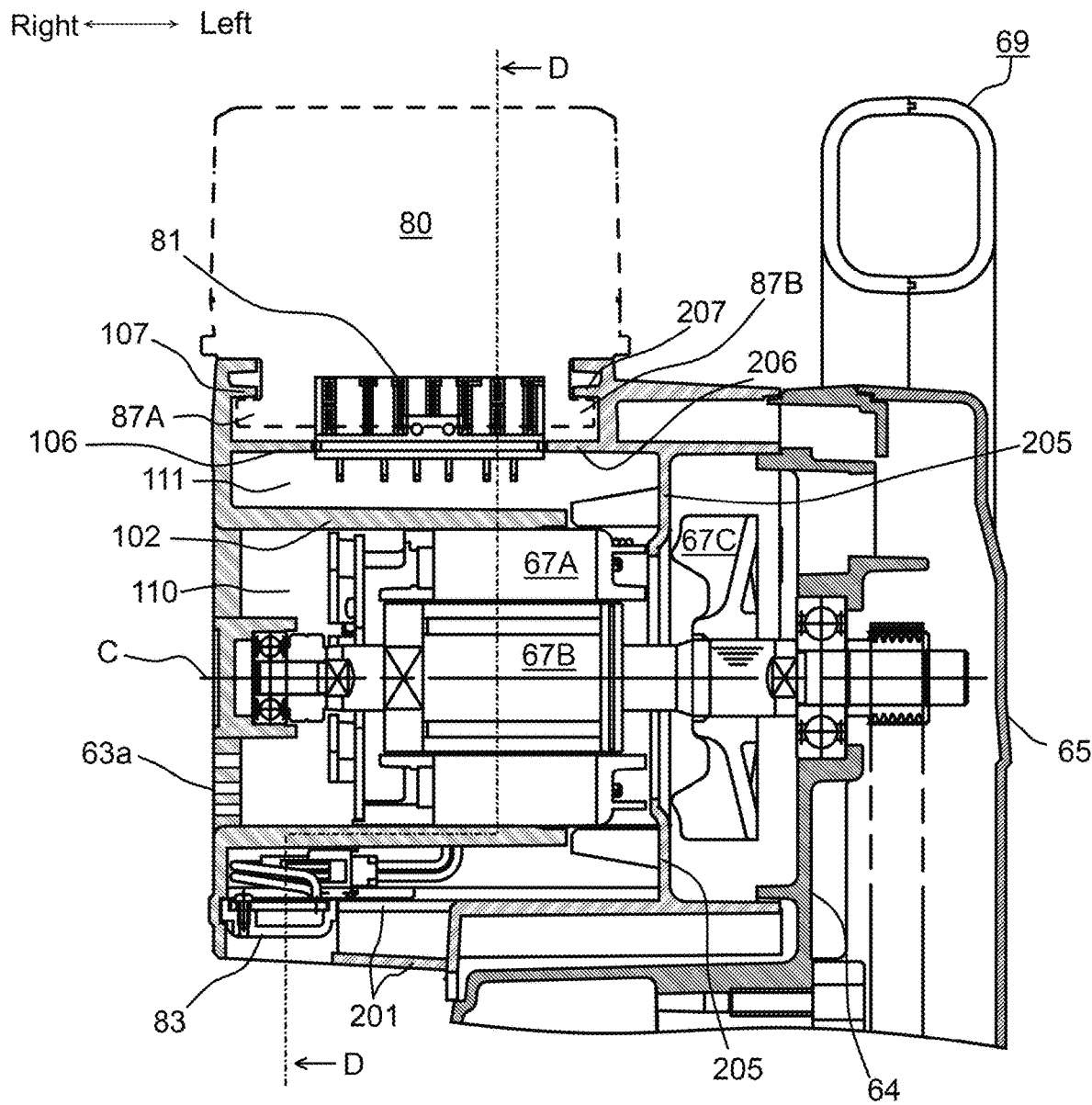
FIG. 4 is an enlarged view of a main part of FIG. 2, showing a state in which a battery pack is attached to a cutting part.

The battery right rail 87A, the battery left rail 87B, the body right rail 107, and the main body left rail 207 are respectively stepped parts that extend from the near side to the far side of the paper in relation to an observer in the state shown in FIG. 4. To attach the battery pack 80 to the battery attachment/detachment part 120, while the battery side rails and the body side rails are engaged as shown in FIG. 4, the battery pack 80 may be attached by being moved (slided) from the near side to the back of the paper in relation to an observer, and may be detached by reverse movement. In a state shown in FIG. 1 where the cutting part 6 is located at a top dead center, the battery pack 80 is attached/detached in the vertical direction.

The body right rail 107 is provided in the right housing 100, and the body left rail 207 is provided in the left housing 200. When the battery pack 80 is attached to the battery attachment/detachment part 120, the battery pack 80 is supported on the right side by the body right rail 107 and on the left side by the body left trail 207. That is, the battery pack 80 is supported between the body side rails. Moreover, the battery pack 80 is provided with a remaining capacity display part 80A, and the operator can check the power remaining in the battery pack 80 with the display of the remaining capacity display part 80A. Incidentally, in the state where the cutting part 6 is located at the top dead center as shown in FIG. 1, the remaining capacity display part 80A faces the front, that is, the operator side, such that the remaining capacity display part can be easily checked before work.

The battery attachment/detachment part 120 is provided with a machine side terminal 81 electrically connected to the battery pack 80. As shown in FIG. 4, the machine side terminal 81 is held by being clamped by a protruding terminal holding part 106 provided on the right housing 100 and a protruding terminal holding part 206 provided on the left housing 200. To enable a good connection with a terminal on the battery pack 80 side, the machine side terminal 81 is supported so as to be able to move slightly to the left and right when being clamped by the two terminal holding parts 106 and 206.

As shown in FIG. 3 and FIG. 4, the inner wall 102 of the right housing 100 is located so as to partially enter inside the outer wall 201 of the left housing 200. Specifically, the inner wall 102 extends to the left beyond a center position of the stator 67A in the direction of the rotary shaft 67D (axis C) and enters into the left housing 200.

A space in the motor housing part 63 is divided into an inner space 110 and an outer space 111 by the inner wall 102 that enters into the left housing 200. The inner space 110 is a space that mainly houses the motor 67, and the inlet port 63a is provided to communicate with the inner space 110. Further, the outer space 111 is a space located outside the inner wall 102 and inside the outer wall 101, and the machine side terminal 81 is partially located in the outer space 111. The inlet port 63a is provided so as not to communicate with the outer space 111. Moreover, the inner wall 102 extends to a left side of the machine side terminal 81 in the direction of the axis C, and the inner space 110 and the outer space 111 communicate with each other on the left side of the machine side terminal 81.

In the present embodiment, because the inlet port 63a does not communicate with the outer space 111, it is a configuration in which the air that enters into the motor housing part 63 enters the inner space 110. Also, since the inner space 110 is adapted to communicate with the outer space 111 at a position leeward of the machine side terminal 81, the air is prevented from flowing into the outer space 111. In this way, the motor 67 and the like disposed in the inner space 110 can be appropriately cooled by air, and since the air from the outside may be prevented from being directed to the electronic parts such as the machine side terminal 81 disposed in the outer space 111, the electronic parts disposed in the outer space 111 can be prevented from dust and the like entering from the outside to attach and accumulate, and the deterioration and damage of the electronic parts can be suppressed. In other words, by disposing the electronic parts housed inside the motor housing part 63 so as to be isolated from the air flow (cooling air), it is possible to suitably suppress deterioration and damage of the electronic parts. Moreover, since the inner wall 102 is made such that it cannot be divided, it is possible to prevent air from leaking to the outer space 111 due to a gap formed in the inner wall 102. Therefore, in the present embodiment, dust intrusion into the outer space where the electronic parts is disposed is suitably suppressed.

Also, as shown in FIG. 3 and FIG. 4, the motor housing part 63 is further provided with a lighting 83. The lighting 83, similar to the machine side terminal 81, is clamped and supported by the right housing 100 and the left housing 200. Note that the lighting 83, unlike the machine side terminal 81, is fixed so as to be unmovable relative to the motor housing part 63 in a state of being clamped.

Figure 5:
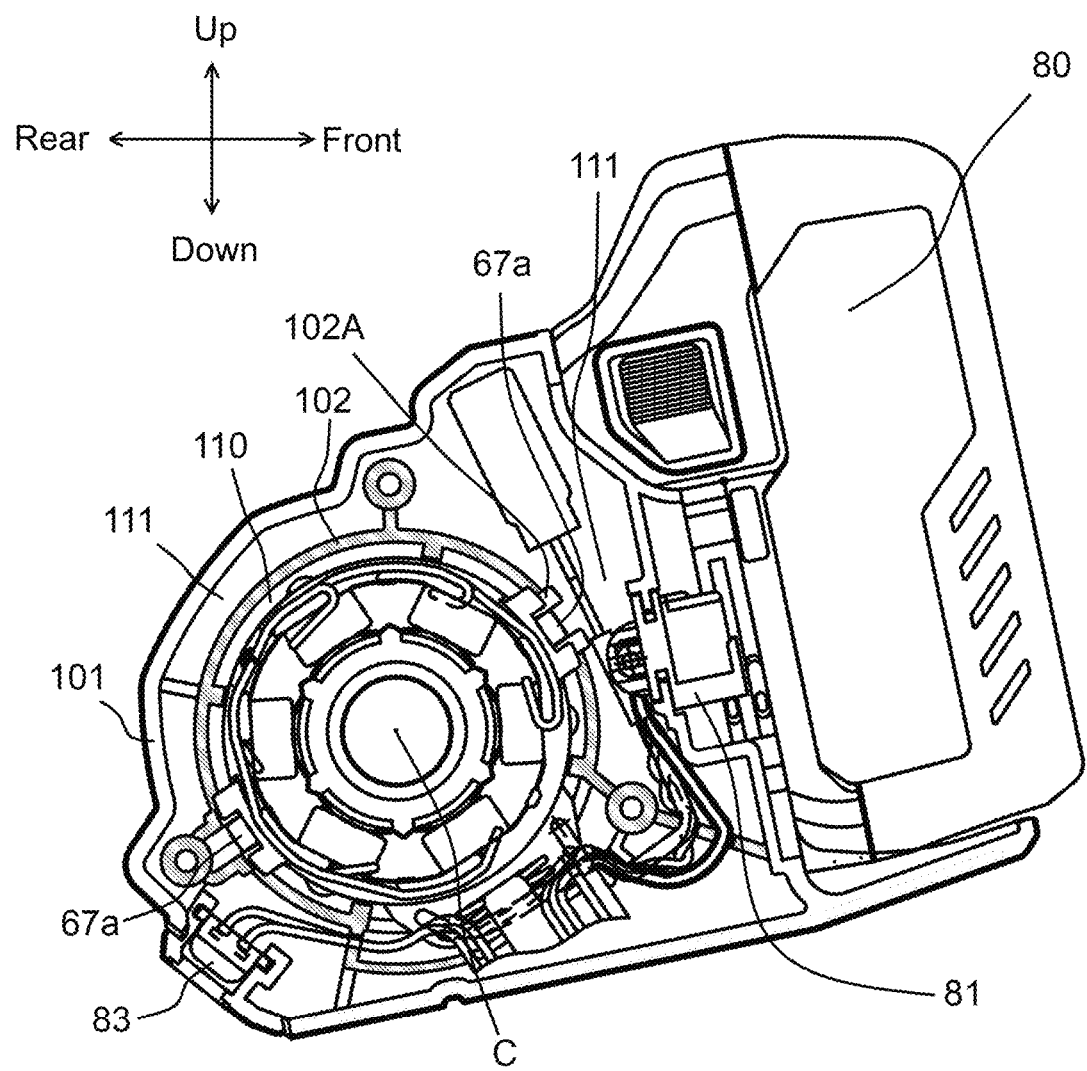
FIG. 5 is a cross-sectional view along line D-D of FIG. 4.
Figure 6:
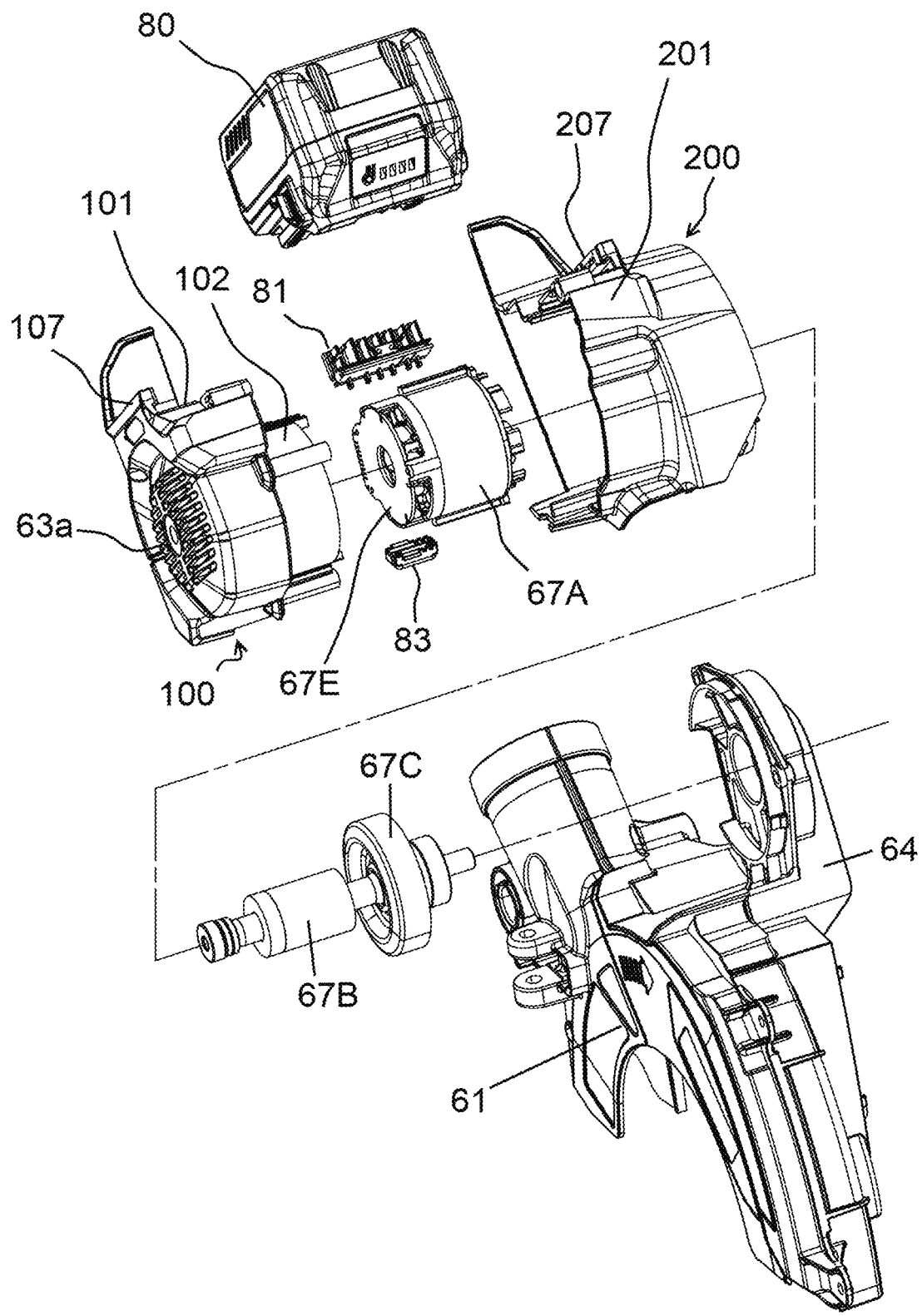
FIG. 6 is a partial exploded perspective view of a tabletop circular saw according to an embodiment of the invention.

FIG. 5 is a cross-sectional view along line D-D of FIG. 4. As shown in FIG. 5, the machine side terminal 81 and the lighting 83 are not in a position where they overlap each other when rotated 180 degrees about the axis C. That is, the machine side terminal 81 and the lighting 83 are not in a point symmetry position with the axis C as a symmetry point. Such a positional relationship may be achieved by the present embodiment in which the motor housing part 63 is divisible in the axial direction. In other words, by setting the mating surface of the outer wall 101 of the right housing 100 and the outer wall 201 of the left housing 200 orthogonal to the rotary shaft 67D, the mating surface is located on an outer surface of the motor housing part 63 in an entire range of 360 degrees in the rotation direction centering on the axis C. Therefore, the electronic parts may be disposed on the outer surface of the motor housing part 63 (excluding the right end part where the inlet port 63a is formed) in the entire range of 360 degrees in the rotation direction centering on the axis C.

Next, the disposition of the machine side terminal 81 and the lighting 83, which are the electronic parts of the invention, will be described with reference to FIG. 3 to FIG. 5.

In FIG. 3, in the direction of axis C, the clamping position of the machine side terminal 81 is shown by a straight line D1, and the clamping position of the lighting 83 is shown by a straight line D2. D1 is a straight line passing through a center of the machine side terminal 81 and orthogonal to the axis C. D2 is a straight line passing through the center of lighting 83 and orthogonal to axis C. As is clear from the view, the positions of the straight line D1 and the straight line D2 are shifted in the axial direction. That is, the clamping position of the machine side terminal 81 and the clamping position of the lighting 83 are different in the axial direction. If the lighting 83 is disposed on D1, since the distance between the lighting 83 and the cutting blade P (the saw cover 61) is too close, a shadow of the cutting blade P or the like on the placement surface 2A will be reflected large, which will have an adverse effect on the work. If the machine side terminal 81 is positioned on D2, the battery pack 80 will protrude significantly to the right side and the cutting part 6 will be larger.

Therefore, in the present embodiment, in order to make the positions of two or more electronic parts, clamped by the segments of the motor housing part divisible in the axial direction, different in the axial direction, each of the right housing 100 and the left housing 200 is provide with the inner wall and the outer wall. By doing so, a degree of freedom can be ensured in the positioning of each outer wall while allowing each inner wall to be fixed to each other.

Accordingly, in the present embodiment, by providing the inner wall 102 inside the outer wall 101 in the right housing 100 and making a position of a left end of the outer wall 101 different in the peripheral direction around the axis C, and by providing the inner wall 202 inside the outer wall 201 in the left housing 200 and making a position of a right end part of the outer wall 201 different in the peripheral direction around the axis C, the clamping positions of multiple electronic parts can be made different in the axial direction. In addition, in the present embodiment, a contact position of the inner wall 102 of the right housing 100 and the inner wall 202 of the left housing 200 is the same position in the direction of axis C.

Also, as shown in FIG. 5, the inner wall 102 has a stator holding part 102A. The stator holding part 102A restricts the rotation of the stator 67A centering on the axis C with respect to the right housing part 100 by engaging with protruding parts 67a protruding from two locations on an outer surface of the stator 67A. That is, the stator holding part 102A prevents the stator 67A from rotating. The stator holding part 102A also restricts the relative movement of the stator 67A with respect to the right housing 100 in the radial direction. Further, the stator 67A is restricted from moving in the axial direction by being clamped between the right housing 100 and the left housing 200. As shown in FIG. 5, the inner space 110 in which the motor 67 is housed and the outer space in which electronic parts are housed are separated in an entire peripheral direction by the inner wall 102.

The following effects are achieved in the present embodiment described above.

(1) The motor housing part 63 can be divided into the right housing 100 and the left housing 200 in the axial direction, and since the right housing 100 made as an integral structure that cannot be divided is provided with the bearing holding part 103 that holds the bearing 67e that rotatably supports the rotary shaft 67D, it is possible to prevent a segmented surface (the mating surface of the right side housing 100 and the left side housing 200) from being located in the bearing holding part 103 itself or around the bearing holding part 103, and therefore the parts can be easily disposed in the motor housing part 63 while the rotary shaft 67D can be firmly held.

(2) Since the right housing 100 and the left housing 200 each are integrally provided with the rail parts for supporting the battery pack 80, the number of parts can be reduced and the cost can be cut down.

(3) Since the motor housing part 63 is divisible in the axial direction, when an electronic part is to be provided on the outer surface of the motor housing part 63, the position of the electronic part in the peripheral direction can be easily set. Further, even when multiple electronic parts are to be provided in the motor housing part 63, the position setting in the circumferential direction becomes easy.

(4) By providing the inner walls inside the motor housing part 63, the inside of the motor housing part 63 is separated into the inner space 110 that communicates with the inlet port 63a and the outer space 111 that does not communicate with the inlet port 63a, and the electronic parts can be positioned in the outer space to improve dust resistance of the electronic parts.

(5) By providing the motor housing part 63 with the inner walls (102, 202) for fixing the right housing 100 and the left housing 200 and by providing on the outside of the inner walls the outer walls (101, 201) for clamping the electronic parts, the clamping positions of the electronic parts can be set regardless of the position at which the right housing 100 and the left housing 200 are fixed. In the present embodiment, such feature allows an axial distance between a carrying handle 69 and the battery pack 80 to be secured, and that the battery pack 80 be kept out of the way when the carrying handle 69 is gripped.

(6) Since the rotation is stopped and the stator 67A in the radial direction is positioned, and the bearing 67e is supported by the right housing 100 that is an integral structure that cannot be divided, the motor 67 can be firmly held in place. In addition, since the bearing 67f is supported by the integral gear case 64, the two bearings (67e, 67f) rotatably supporting the rotary shaft 67D are each supported by a rigid part that is an integral structure, allowing the motor 67 to have a high output.

(7) The battery pack whose attaching direction is longitudinal can be configured to be attached to the motor housing part in the direction orthogonal to the axis C, therefore it is possible to prevent the cutting part 6 from increasing in size.

As described above, in the present embodiment, the tabletop circular saw has been described as an example of the work machine, but the invention is not limited to the above-described embodiments, and various modifications, changes, and improvements can be made without departing from the spirit of the invention.

Figure 7:
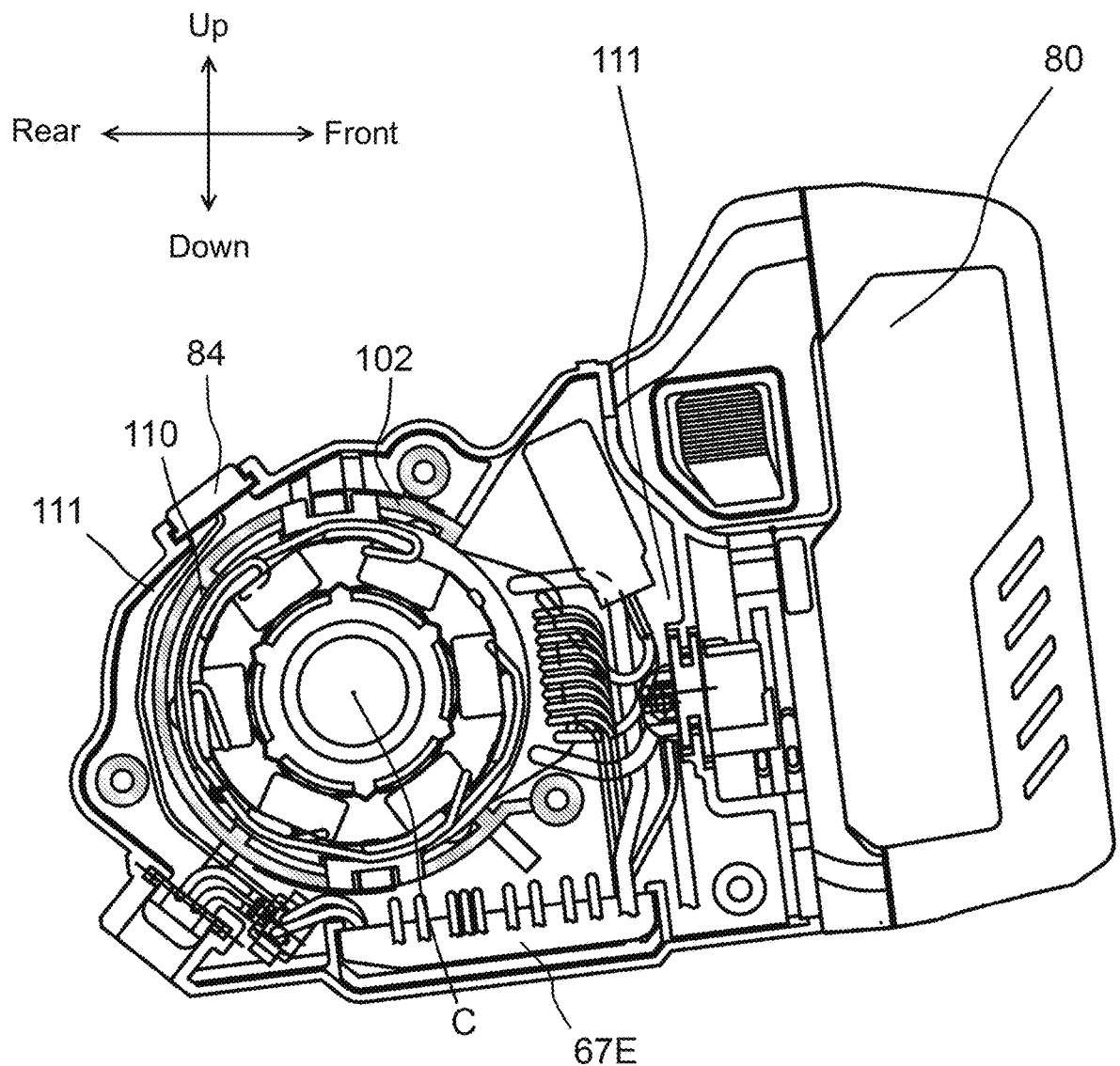
FIG. 7 is a view corresponding to FIG. 5 in a tabletop circular saw according to another embodiment of the invention.

For example, in the above-described embodiment, the motor housing part is configured to clamp three parts, that is, the battery pack 80, the machine side terminal 81, and the lighting 83, but more parts can be clamped by the motor housing part. For example, FIG. 7 is a view corresponding to FIG. 5 in a modified example, and shows a configuration in which, in addition to the above-described embodiment, an operation panel 84 capable of turning on and off the lighting 83 may also be clamped. In the modified example, since the lighting 83 and the operation panel 84 can be disposed at different positions in the peripheral direction based on the freedom in disposing the electronic parts, it is possible to prevent the operator's eyes from being dazzled by the lighting 83 when the operation panel 84 is operated. Thus, according to the invention, four or more electronic parts and the like may be clamped at various positions in the peripheral direction on the outer surface of the motor housing part.

Further, the invention is also applicable to a work machine driven by a motor other than the tabletop circular saw, for example, a portable work machine such as a circular saw or a grinder.

What is claimed is:

1. A work machine, comprising:
a motor comprising a rotary shaft;
a bearing rotatably supporting the rotary shaft;
a motor housing part housing the motor;
a battery pack for supplying power to the motor; and
a fan rotating integrally with the rotary shaft;
wherein the motor housing part is provided with a battery attachment/detachment part to which the battery pack is attached/detached,
the battery attachment/detachment part comprises two rails engaged with the battery pack,
the motor housing part is divisible into two segments in an axial direction of the rotary shaft,
one of the two rails is provided in one of the two segments, and the other of the two rails is provided in the other of the two segments, and
at least the one of the two segments is configured to form an indivisible integral structure and supports the bearing,
wherein the motor housing part is provided with an inlet port, and the motor is cooled by air flowing in from the inlet port,
wherein, by an inner wall provided in the one of the two segments, an inside of the motor housing part is separated into an inner space and an outer space, and the outer space is isolated from a flow path of the air flowing in from the inlet port.

2. The work machine according to claim 1, wherein the motor housing part is provided with a plurality of electronic parts to be exposed to an outside,
and one of the plurality of electronic parts and other one of the plurality of electronic parts are respectively provided in positions different in a rotation direction of the rotary shaft.

3. The work machine according to claim 2, wherein the electronic parts are clamped by the two segments.

4. The work machine according to claim 2, wherein the motor housing part is provided with a lighting,
and the lighting is clamped by the two segments.

5. The work machine according to claim 4, wherein the motor housing part is provided with an operation panel capable of turning on and off the lighting,
and the operation panel is clamped by the two segments.

6. The work machine according to claim 1, wherein the battery attachment/detachment part comprises a machine side terminal electrically connected to the battery pack,
and the machine side terminal is clamped by the two segments.

7. The work machine according to claim 1, wherein the one of the two segments is provided with an inner wall, and an outer wall located outside of the inner wall,
and, by joining the inner wall to the other of the two segments, the two segments are fixed to each other.

8. The work machine according to claim 1, wherein the motor housing part is provided with electronic parts to be exposed to an outside,
and the electronic parts are clamped by the two segments in a manner that at least a part of the electronic parts is located in the outer space.

9. The work machine according to claim 1, wherein a fan guiding part protruding from an inner surface of the other of the two segments is integrally formed on the other of the two segments,
and the flow of the air is guided by the fan guiding part.

10. The work machine according to claim 1, wherein the air flows in the motor housing part along the axial direction of the rotary shaft and the motor housing part is provided with electronic parts to be exposed to an outside,
and the outer space communicates with the inner space downstream of the electronic parts in the direction in which the air flows.

11. A work machine, comprising:
a motor comprising a rotary shaft;
a bearing rotatably supporting the rotary shaft; and
a motor housing part housing the motor;
wherein the motor housing part is divisible into two segments in an axial direction of the rotary shaft;
in the motor housing part, electronic parts are clamped by the two segments to be exposed to an outside;
and one of the electronic parts and other one of the electronic parts are respectively provided in positions different in a rotation direction of the rotary shaft,
wherein one of the two segments is provided with an inner wall, and an outer wall located outside of the inner wall,
and, by joining the inner wall to the other of the two segments, the two segments are fixed to each other.

12. A work machine, comprising:
   a motor comprising a rotary shaft;
   a bearing rotatably supporting the rotary shaft;
   a motor housing part housing the motor; and
   a battery pack for supplying power to the motor;
   wherein the motor housing part is provided with a battery attachment/detachment part to which the battery pack is attached/detached,
   the battery attachment/detachment part comprises two rails engaged with the battery pack,
   the motor housing part is divisible into two segments in an axial direction of the rotary shaft,
   one of the two rails is provided in one of the two segments, and the other of the two rails is provided in the other of the two segments, and
   at least the one of the two segments is configured to form an indivisible integral structure and supports the bearing,
   wherein the one of the two segments is provided with an inner wall, and an outer wall located outside of the inner wall,
   and, by joining the inner wall to the other of the two segments, the two segments are fixed to each other.

* * * * *